United States Patent [19]

Barnum

[11] 4,193,055
[45] Mar. 11, 1980

[54] AUTOMATIC SENSITIVITY LEVEL ADJUSTMENT

[76] Inventor: Charly Barnum, 160 Overlook Ave., Hackensack, N.J. 07601

[21] Appl. No.: 776,751

[22] Filed: Mar. 11, 1977

[51] Int. Cl.² .............................................. G01S 9/66
[52] U.S. Cl. .................................. 367/94; 343/5 PD
[58] Field of Search ............... 340/3 D, 560; 307/117; 343/5 PD

[56] References Cited

U.S. PATENT DOCUMENTS

| | | | |
|---|---|---|---|
| 3,459,961 | 8/1969 | Ravas | 340/3 DX |
| 3,665,443 | 5/1972 | Galvin | 340/3 DX |
| 3,761,909 | 9/1973 | Schweitzer et al. | 340/3 DX |
| 3,934,156 | 1/1976 | Galemmo et al. | 307/117 |
| 4,081,784 | 3/1978 | Wilson et al. | 340/3 D |

Primary Examiner—Richard A. Farley
Attorney, Agent, or Firm—Pennie & Edmonds

[57] ABSTRACT

The instant invention relates to a device which automatically adjusts the sensitivity level of a system which can be used to control power circuits. In particular, the device has particular value in connection with devices which detect motion in a confined space through the use of a Doppler shift of ultrasonic or electromagnetic waves and turn lights on and off depending upon whether or not there is human movement in the confined space. The device adjusts the gain of an AGC such that the gain varies inversely with the amplitude after a predetermined time delay. The time delay permits short term amplitude gain but suppresses the gain of constant amplitude signals thereby suppressing or filtering out long term constant noise. The gain in a "noisy" environment would be suppressed thus causing the sensitivity of the system to be lowered when ambient noise is at an appreciable level and conversely, would increase the gain and correspondingly the gain when there is a low noise environment.

8 Claims, 5 Drawing Figures

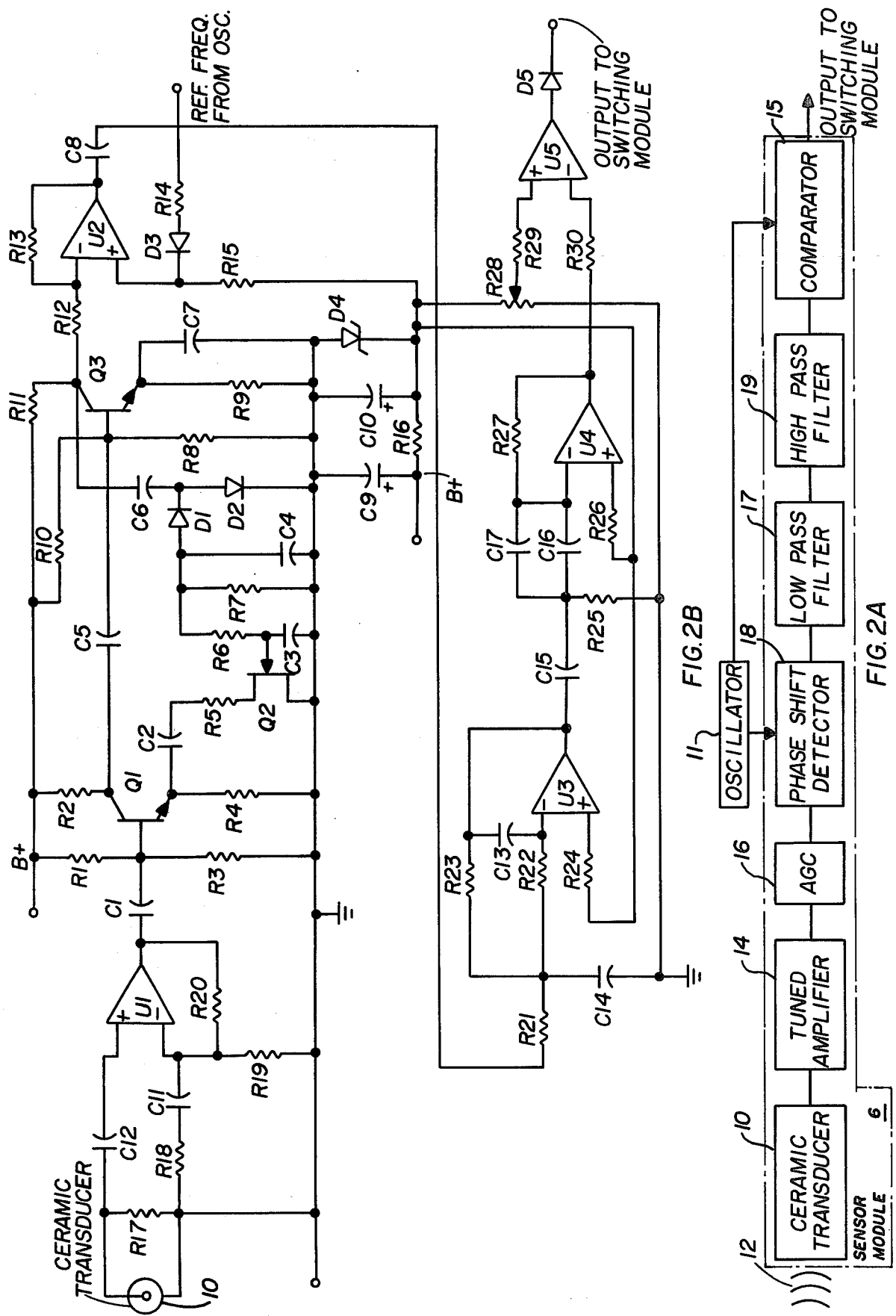

AUTOMATIC SENSITIVITY LEVEL ADJUSTMENT

BACKGROUND OF THE INVENTION

1. Field of the Invention

This invention relates to a device for automatically adjusting the sensitivity level of a sensor circuit for a power circuit control device. More particularly, the sensitivity level of a Doppler type approach or presence sensing system is varied inversely with the noise level of the environment.

2. Brief Description of the Prior Art

One fundamental approach to motion detection is found in U.S. Pat. No. 3,668,703, wherein a motion detector relying upon what is commonly known as Doppler shift detection, is disclosed.

The patent discloses that various intrusion detection systems are based on the concept of radiating energy such as ultrasonic or electromagnetic energy into the area to be detected and detecting the presence of an intruder by noting any change in the energy resulting therefrom. A highly satisfactory system based on the Doppler frequency effect had been developed. For example, U.S. Pat. No. 3,242,486 which is assigned to Johnson Service Co. discloses a triggered intrusion detection system employing the Doppler effect. Energy of a given frequency is radiated into the protected area and the reflected signals are received by a suitable receiver, along with a portion of the transmitter energy. Any movement of a body within the area results in a Doppler frequency output from the receiver unit. The Doppler frequency is detected and utilized to energize or trigger an alarm and thereby indicate the presence of an intruder.

The basic operation of a low-powered Doppler detector is based on the comparison of the transmitted and an echo signal. In the absence of an intruder or other target motion the transmitted and echo signals will have the same frequency. Any motion, however, results in a shifting in the frequency in the reflected or echo signal and not of the transmitted or original. The shift will be dependent upon the radial velocity of the intruder.

U.S. Pat. No. 2,393,014 to Bartholy and assigned to Westinghouse Electric Corporation and U.S. Pat. No. 3,459,961 to Ravas and assigned to Westinghouse Electric Corporation disclose that the foregoing Doppler shift principles can be applied to the control of power circuits, and in particular lights, through the use of a time delay system. These and similar patents relating to power circuit control devices do not distinguish between the requirements of a light control system and an alarm control system, but merely fall back on the available Doppler shift motion detection technology. It is recognized that there is a great similarity between the requirements for the two systems and one can incorporate an alarm circuit to trigger a mechanism subject only to a predetermined time delay. However, in commercial applications it has been found that the alarm systems requirements are not totally compatible with light control requirements, and accordingly in actual use difficulties have been encountered.

SUMMARY OF THE INVENTION

It has now been found that there are characteristics of a light control mechanism and alarm systems which are grossly incompatible. For example, it has been found that in an alarm device triggering at a first possible indication of human motion, is considered to be essentially intolerable since even one false alarm can cause the necessity to expend a great deal of effort to determine whether the premises have, in fact, been penetrated by an intruder. Further, the need to repeatedly trigger a signal is totally nonexistant in alarm devices. Alarm devices typically rely on integrating over long periods of time, careful amplitude thresholding, extremely careful selection of single frequencies or combinations thereof, to determine whether a true signal is present as typified in Corbell, U.S. Pat. No. 3,242,486 and Bagno U.S. Pat. Nos. 2,903,683 and 2,794,974. Other devices compare the negative Doppler shift with the positive Doppler shift to determine whether a symmetrical pattern noncharacteristic of human motion is present.

It has now been found that directly employing the technology of typical alarm systems creates problems in light control systems because in certain application, upon entering a room, the lights do not respond instananeously. This is due to the fact that an alarm need not respond the moment a person enters the room, but merely must respond within some short time period thereafter. Further, when a person has entered the room, it is critical that the presence continue to be sensed in a light control system, so that the lights are not permitted to go out. However, once again, we have a noncorrelation between the two systems, since the light control mechanism employs a time delay and the requirements are that within this time delay period at least one trigger signal be sensed so as to maintain the lights on if the person is in the room.

It has now been found that failure to trigger a lighting mechanism on an absolute and immediate basis and preventing undesired false turning off of lights, can be achieved through the use of a novel filtering sensitivity adjusting, amplifying control which automatically adjusts to the amplitude and excursion characteristics of the input signal. It has been determined that human motion will produce erratic Doppler signals whereas noise typical of air conditioners and the like, will produce a fairly consistent Doppler for an extended period of time. Time integration is typically used in burglar alarms to eliminate these consistant signals, however it has now been found that the use of an integration circuit, at least for a short time, can mask a true signal produced by human motion, particularly when it overlaps with a high noise signal. Thus an integrator has been found to be incompatible with a light control mechanism because of the possibility of eliminating or delaying response to a true signal and the tendency to prevent immediate response to a true signal because of the time integrated requirement.

In one aspect of the instant invention, a device automatically adjusts the sensitivity level of the system which can be used to control power circuits. The device adjusts the gain of an AGC such that the gain varies inversely with the amplitude after a predetermined time delay. The time delay permits short term amplitude gain but suppressed the gain of constant amplitude signals, thereby suppressing or filtering out long term constant noise. The gain in a "noisy" environment would be suppressed thus causing the sensitivity of the system to be lowered when ambient noise is at an appreciable level and conversely, would increase the gain and correspondingly the gain when there is a low noise environment.

BRIEF DESCRIPTION OF THE DRAWINGS

The advantages of the invention will be apparent from the following description of a preferred embodiment of the invention, particularly when read in conjunction with the accompanying drawings, where:

FIG. 2A is a block diagram of the sensing system of the present invention;

FIG. 2B is a schematic diagram corresponding to the block diagram of FIG. 2A;

DESCRIPTION OF THE INVENTION

Figure 1:
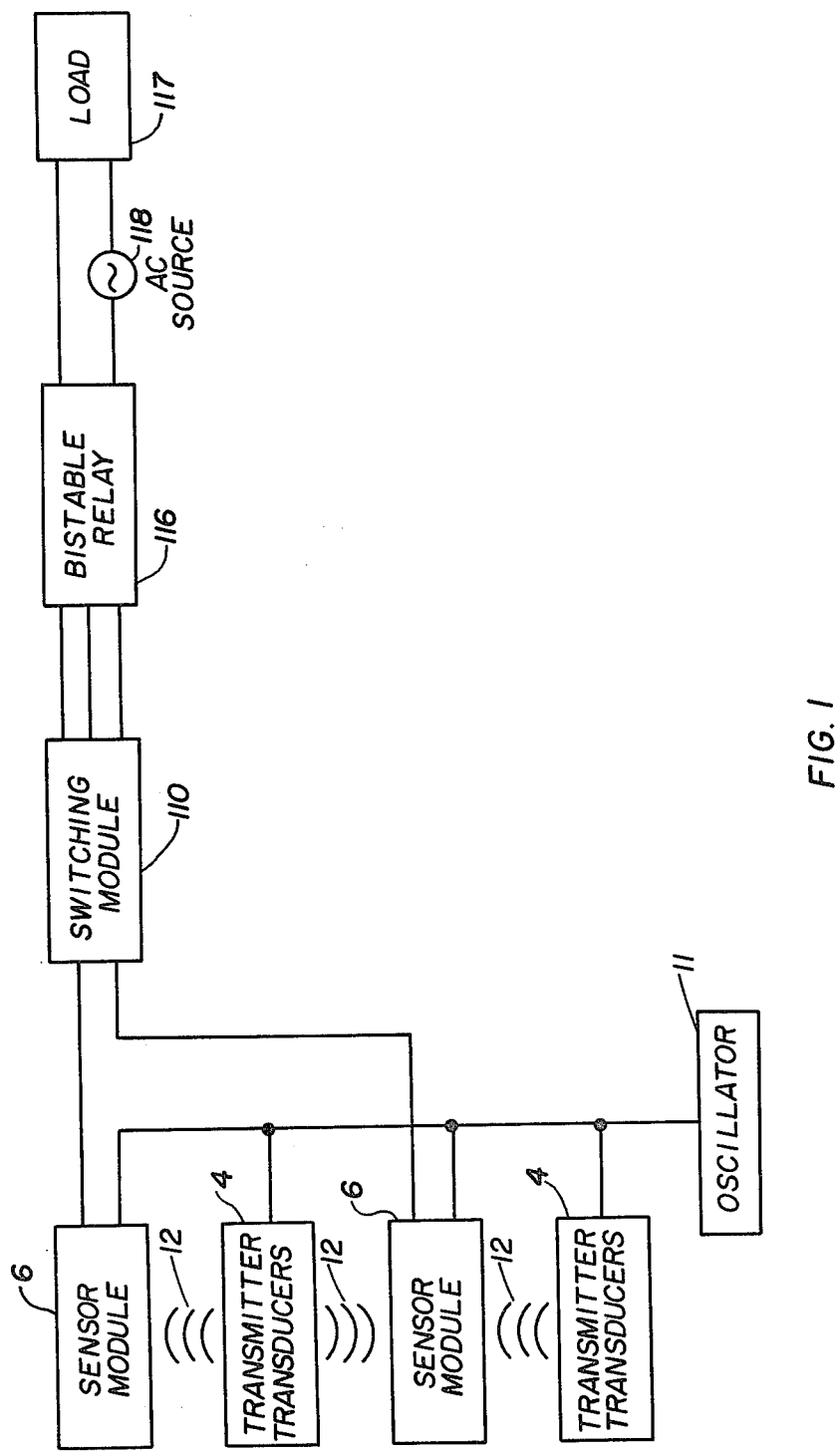
FIG. 1 is a block diagram illustrating the system of the present invention.

Referring to FIG. 1 a diagrammatic illustration of the receiver or sensor system is shown. In FIG. 2A, the sensor module 6 is shown in its component stages along with oscillator 11. The ceramic transducer 10 receives the ultrasonic waves 12 within the prescribed area and produces an electric signal representative of the sound wave received from the prescribed area. The electric signal is amplified by a tuned amplifier 14, and the output of which is coupled to the input of the AGC 16. The purposes of the AGC 16 are as follows:

1. To maintain a constant carrier amplitude not to extend beyond a narrow range of amplitudes for use in demodulation in following stages.
2. To amplify positive Doppler information, provided it initially has a minimum amplitude.
3. The varying of the sensitivity of the sensor system so as to maintain suitable amplitude differentials in environments having varying noise levels by decreasing the gain in the presence of noise and increasing the gain in the absence of noise.
4. The amplify the carrier frequency and Doppler 1information while providing suitable signal to noise ratios.

By way of further background, it is noted that a typical approach to the treatment of the electrical signal produced by a transducer 10 in response to electromagnetic or ultrasonic radiation is disclosed in U.S. Pat. No. 3,662,371 to Lee et al. A system is disclosed in which a transmitter radiates ultrasonic waves at an essentially constant amplitude and frequency (a "carrier" frequency) into a space to be protected. Reflected waves impinge upon and are demodulated by a received, the output of which is an electrical signal which is representative of the amplitude modulations of the received wave. The output of the receiver is applied to a saturation amplifier or constant level AGC which converts the electrical signal to an alternating signal, the excursions of which have a fixed amplitude whenever the electrical signal exceeds a predetermined reference amplitude. Otherwise, for amplitudes less than a predetermined amplitude, the signal excursion (i.e., the peak-to-peak amplitude) is less than the fixed amplitude excursion.

Similarly, in U.S. Pat. No. 2,767,393 to Bagno a similar amplitude limiting circuit is disclosed, particularly in cloumn 4, lines 35 to 46.

The instant system departs from the prior art by providing a signal whose excursions are maintained at a fixed amplitude, or at least within a fixed amplitude range depending upon the level of gain produced by the AGC except for short term excursions outside of the fixed amplitude range. The effect of the system is to respond immediately to amplitude peak-to-peak fluctuations and suppress greater than short term constant peak-to-peak amplitude levels. Noise of a constant nature is therefore suppressed and gain is lower in the presence of constant amplitude noise than in the absence of noise.

The output of the AGC 16 is connected to the input of the phase shift detector 18, which provides the proper phase shift relationship between the reference frequency produced by the oscillator 11 a transmitter as sound waves into the prescribed area, and the received sound waves altered by Doppler energies; and to prepare for the amplification of the amplitude of the signals representing the Doppler energy.

The output of the phase shift detector 18 is connected to the active low pass filters 17 which demodulates the carrier frequency of 40 KHz. and passes onto the next stage any frequency less than 78 Hz.

It is noted that the exact values are representative only and are not intended to indicate the only values which can be employed. For example, typical in the prior art 20 KHz. carrier waves are used and the desired Doppler signals are considered to be in the 2 to 200 Hz. range. It has however been found that narrowing the bandwidth of the Doppler signal to about 15 to 80 Hz. (relative to a 40 KHz. carrier wave) provides an extremely effective balance between responding to desired signal and rejected unwanted signals. It is recognized that the accepted range for human motion produced Doppler signals is about 6 to 360 Hz. (3 to 180 Hz. at 20 KHz., Bagno U.S. Pat. No. 2,655,645), but the narrower range has been found to produce improved results in power circuit control devices. Unexpectedly, the narrower range reduces the tendency to respond to noise, that is, Doppler signal not produced by human motion, without sacrificing the ability to actuate the power circuit control device immediately upon entrance of a person into the room and without adversely affecting the ability to maintain the device activated while a person is in the room. While it may not be fully understood why the narrower bandwidth eliminates a greater percent of unwanted signals than desired signal, it is possible that because of the complexity of human motion, even motion at low speed and high speeds contain sufficient body motion at intermediate speeds to produce Doppler signals in the 15–80 Hz. range. Thus, narrowing the Doppler signal bandwidth has been found not to adversely affect responsivity to humans while being more discriminating and increasing the rejection of noise.

The next stage is the active high pass filter 19 which eliminates frequencies less than 18 Hz. and amplifies frequencies greater than 18 Hz. but less than 78 Hz.. The following stage is a comparator 15 which compares the output of the active high pass filter 19 against a controlled variable voltage level producing an output switching signal which represents a Doppler energy created by movement of an object sufficient in mass moving at a sufficient velocity within the prescribed area.

In reference to FIG. 2B a schematic illustration of the sensor module 6 is shown. The ceramic transducer 10 receiving the sound waves 12 from the prescribed area creates an electro magnetic force which is amplified by U1 and its associate components which constitute tuned amplifier 14. The tuned amplifier 14 will amplify a narrow band of frequencies 39 KHz to 41 KHz. The output of this stage is coupled through capacitor C1 to the base of the transistor Q1, the first stage of the AGC 16. The transistor Q1 amplifies the carrier and the Doppler information. The collector of transistor Q1 is coupled to the base of transistor Q3 through capacitor C5, The transistor Q3 inturn further amplifies the carrier and its Doppler information. The collector of transistor Q3 is coupled to capacitor C6 which inturn is coupled to transistor Q2 and its associative components which is the feedback network which alters the gain of transistor Q1. The use of an AGC 16 for the purpose of maintaining a constant carrier amplitude for proper system stability is not uncommon to the prior art however, the AGC 16 of the present invention incorporates an unobvious alteration to the circuit. It is appreciated by those who are skilled in the art that many factors affect the stability of this kind of system. Some of these factors can be air temperature, humidity, electronic component in stability. It is appreciated that the energies created by the Doppler require sufficient amplification for detection and at the same time maintain a suitable signal to noise ratio.

Signal present at the base of transistor Q1 is amplified by the amplifier comprised of transistor Q1 and its associated components. The amplifier signal present at the collector of transistor Q1 is coupled to the base of transistor Q3 via capacitor C5. The signal is amplified once more by the fixed gain of transistor Q3 and its associated components. The amplified signal present at the collector of transistor Q3 is connected to the inverting input of the phase shift detector U2 via resistor R12. The collector of transistor Q3 is also connected to one side of capacitor C6. The other side of capacitor C6 is connected to the junction of the cathode of diode D1 and the anode of diode D2. The anode of diode D1 is connected to the gate of F.E.T. Q2 via resistor R6. The pulsating DC signal present at the collector of transistor Q3 will charge and discharge capacitor C6 respectively to the pulsating DC signal.

The half wave rectification provided by capacitor C6, diode D1, diode D2 provides a charging of capacitor C4 to a negative potential and subsequently capacitor C3 through charging path resistor R6. An increase of signal amplitude at the collector of transistor Q3 will produce a more negative potential at the anode of Diode D1 due to an increase charging of capacitor C4. A decrease of signal amplitude present at the collector of transistor Q3 will produce a less negative potential at the anode of diode D1 due to a decrease charging of capacitor C3 and the discharge path for capacitor C3 and C4 provided by resistor R7. This charging and discharging of capacitor C4 and subsequently of capacitor C3 will increase or decrease respectively the reverse bias of the gate of F.E.T. Q2 in respect to F.E.T. Q2 source. When a decrease signal amplitude present at the base of transistor Q1 is maintained for a period of time, in excess of the period of time that is required for discharging of capacitor C3, the gate of F.E.T. Q2 will be less negative in respect to F.E.T. Q2 source input. This decrease in reverse bias due to the discharge of capacitor C3 of the gate of F.E.T. Q2 to source of F.E.T. Q2 causes F.E.T. Q2 to increase conduction reducing the emitter network impedance provided by resistor R4 and F.E.T. Q2, and increasing the gain of amplifier transistor Q1 and associated components. This increase in gain of amplifier transistor Q1 and associated components causes capacitor C3 to charge more negatively until there is a stabilization of gain of the amplification of the signal amplitude present at the base of transistor Q1 and the charging of capacitor C3.

When there is an increase of signal amplitude present at the base of transistor Q1 the signal amplitude is amplified at the present gain of amplifier transistor Q1 and its associated components. When the increase signal amplitude present at the base of transistor Q1, is maintained for a period of time, in excess of a period of time for a negative increase charging capacitor C3, the gate of F.E.T. Q2 will be more negative in respect to F.E.T. Q2 source input. This increase in reverse biasing, due to the negative increase charge of capacitor C3, of the gate of F.E.T. Q2 to the source of F.E.T. Q2 causes F.E.T. Q2 to decrease conduction, increasing the emitter network impendance of amplifier transistor Q1 and its associated components and decreasing the gain of the amplification of the amplifier Q1 and its associated components. This decrease in the gain of transistor Q1 and its associated components causes capacitor C3 to discharge less negatively until there is a stabilization of gain of the amplifier transistor Q1 and its associated components and the charging of capacitor C3.

The net results of the circuits described above allows for the introduction of environmental changes which will effect the characteristics of the non Doppler carrier without upsetting the sensitivity to the real Doppler information. A slight increase or decrease in background Doppler signal amplitudes, representative of air turbulance, terperature change, and the like, are eliminated by the time delay response of the AGC 16, created by the RC time constant of capacitor C3 and resistor R6. A gross increase or decrease of background Doppler signal amplitudes representive of massive air turbulance such as the turning on of an air conditioner and the like, are compensated for as well by the AGC 16. Here the AGC 16 senses a an increase of signal amplitude of a constant duration in background Doppler and reduces gain of the AGC 16 maintaining a constant amplitude carrier representative of non Doppler information. The real Doppler information, however, is amplified by the present gain of transistor Q1 and associated components since the AGC 16 can not respond to quick sporadic changes in amplitude.

By the proper selection of a value of resistor R5 the dynamic impedance range of F.E.T. Q2 can be altered to suit the environment. By selecting between certain suitable values of resistor R5 an increase or decrease of sensitivity of the system can be obtained. An increase of resistance of resistor R5 will increase the low range impedance of F.E.T. Q2, therefore, decreasing the maximum gain of amplifier transistor Q1 and associated components without effectively altering the minimum gain of amplifier transistor Q1 and associated components. Signal amplitudes present at the base of transistor Q1, of low constant amplitudes will reduce the reverse bias of the gate of F.E.T. Q2 in respect to F.E.T. Q2 source reducing the impedance of F.E.T. Q2 so that it represents a lower impedance path than the impedance path provided by resistor R4. Therefore, the gain of amplifier transistor Q1 and associated components will be determined by the total impedance of resistor R5 and transistor Q2. This limiting of gain of amplifier transistor Q1 and associated components will maintain a lower non-Doppler carrier. When the signal amplitude present at the base of transistor Q1 is of higher amplitudes the gate of F.E.T. Q2 is further reverse biased in respect to F.E.T. Q2 source, until F.E.T. Q2 represents a very high impedance path in the emitter network of transistor Q1. The high impedance provided by transistor Q1 being considerably higher than the impedance of resistor R4, the gain of amplifier transistor Q1 and its associated components will be determined by resistor R4 resistance value. The same is true when resistor R5 is of a lower resistance value than just presented, except the gain of amplifier transistor Q1 and its associated components of the low amplitude signals will be increased due to the lower total impedance of resistor R5 and F.E.T. Q2, maintaining a higher non-Doppler carrier amplitude.

The phase shift detector U2 and its associated components provides a phase shift relationship between the reference frequency and the carrier frequency with Doppler information. The carrier frequency with Doppler information is presented to the inverting input of operational amplifier U2 while the reference frequency is presented to the noninverting input of operational amplifier U2. Resistor R14 reduces the reference frequency amplitude and diode D3 prohibits the negative half cycle from being passed to the non-inverting input of operational amplifier U2. Since the reference frequency is higher in amplitude than the carrier frequency with Doppler information the operational amplifier U2 goes into a state of saturation on the positive half cycle of the reference frequency. The Zener diode network diode D4, capacitor C10, resistor R16, with resistor R15 provide a constant current source on the off cycle of the reference frequency to be sensed at the non-inverting input of operational amplifier U2. With no pulsating DC signal present at the collector of transistor Q3, this would allow the output of operational amplifier U2 to follow the noninverting input of operational amplifier U2, first to saturation on the positive half cycle of the reference frequency, than to a DC reference voltage determined by the current matching of the inverting and the non-inverting inputs of operational amplifier U2 at the time of the off half cycle of the reference frequency. When a pulsating DC signal is present at the collector of Q3 and is within phase with the reference frequency the negative half cycle of the carrier frequency with Doppler information would cause the output of operational amplifier U2 to invertly follow the amplitude and the form of the carrier frequency and the Doppler information signal. On the positive half cycle of the carrier frequency and the reference frequency the output of operational amplifier U2 would be in saturation, since the amplitude of the reference frequency is greater than the amplitude of the carrier frequency. When the carrier frequency is 180° out of phase with the reference frequency at the time of the off half cycle of the reference frequency, the output of operational amplifier U2 would invertly follow the amplitude and form of the carrier frequency and Doppler information positive half cycle. Any phase shift between the carrier frequency and the reference frequency would cause the output of operational amplifier U2 to follow the amplitude of the carrier frequency and its Doppler information at the time of the off cycle of the reference frequency, above and below the DC reference established by the Zener network and resistor R15.

The wave form present at the output of operational amplifier U2 is of such nature as to be interpreted by following stages as a high frequency carrier of constant amplitude with a low amplitude modulation frequency representive of the Doppler information. The following stages provide demodulation of this high frequency carrier and amplification of the low frequency amplitudes of Doppler information.

Due to the nature of the Doppler a frequency transmitted to permeate a prescribed area, on receiving this frequency will be altered by the accostical characteristics of the prescribed area. These acoustical characteristics are constantly changing due to air temperature change, humidity change and the alike; and the reflected sound wave produced by the transmitter frequency will be constantly increasing and decreasing with frequency and amplitude. The wave form presented to the input of the phase shift detector operational amplifier U2, representative of the frequency and the Doppler frequency and its corresponding amplitude, is compared to the original frequency transmitted. The net results of the phase shift detector, functionally described above, is a wave form representive of a phase shift relationship between 40 KHz. and the carrier 40 KHz. frequency and the plus or minus value of frequency deviation and its amplitude representive of the Doppler energies. After demodulation of the 40 KHz. frequency, the information encapsulated between the half wave saturated output state of operational amplifier U2, which swings plus or minus about the DC reference provided, will be representive of the Doppler amplitude and frequency. As the non-saturated state of operational amplifier U2 increase in positive amplitude above the DC reference, decrease in positive amplitude and crossing through the DC reference, increasing a negative amplitude, then decreasing in negative amplitude to the DC reference, the amplitude representative of the Doppler information have completed one cycle. When this cycle period is less than 55 msec. and greater than 13 msec. it is within frequency band of 18 Hz. to 78 Hz. considered "real" Doppler energy at transmitted frequency to 40 KHz.

The output of operational amplifier U2 is coupled to the input of the active low pass filter operational amplifier U3 and associated components via capacitor C8. The high frequency of 40 KHz. is demodulated by means of a low impedance path to ground provided by capacitor C14. Operational amplifier U3 and its associated components amplify frequencies less than or equal to 78 Hz.. The output of operational amplifier U3 is coupled to the input of the active high pass filter operational amplifier U4 and associated components via capacitor C15. Frequencies less than 18 Hz. find a low impedance path to ground provided by resistor R25 and a high impedance deterent provided by capacitor C16 and capacitor C17. Operational amplifier U4 and its associated components amplify frequencies greater than or equal to 18 Hz. When there is no Doppler frequency present, the output of operational amplifier U4 is in a saturated state due to the current reference on a non-inverted input of operational amplifier U4 provided by resistor R26. When Doppler frequencies of greater than or equal to 18 Hz. are present, the inverted input is presented with an increase in current provided by capacitor C16. When this current is greater to or equal to the non-inverting input, the output of operational amplifier U4 begins to swing negative taking the operational amplifier U4 out of saturation. A half wave representation of the Doppler frequency is presented to the non-inverting input of operational amplifier U5 in amplitude and form of the Doppler frequency. Operational amplifier U5 and its associated components is a comparator stage which compares the currents presented to its inverting and non-inverting inputs. The non-inverting input of operational amplifier U5 is presented with a constant current source provided by resistor R28 and resistor R29. Resistor R28 can be adjusted to various resistance, therefore a variable current can be presented to the non-inverting input of operational amplifier U5. This current at the non-inverting input of operational amplifier U5 is a reference point to be compared to the inverting input current of operational amplifier U5. As there is an increase in current present at the inverting input of operational amplifier U5, in excess of the non-inverting input current of operational amplifier U5, the output of the comparator operational amplifier U5 swings to an off state to an on state. The increase or decrease of the current present at the non-inverting input of operational amplifier U5 will determine the necessary current levels, representative of the Doppler amplitudes, required to switch the output of operational amplifier U5.

The output of the sensor is OR tied to the switching module via diode D5. This provides a means of connecting a plurality of sensors to one Switching Module 110.

Figure 3A:
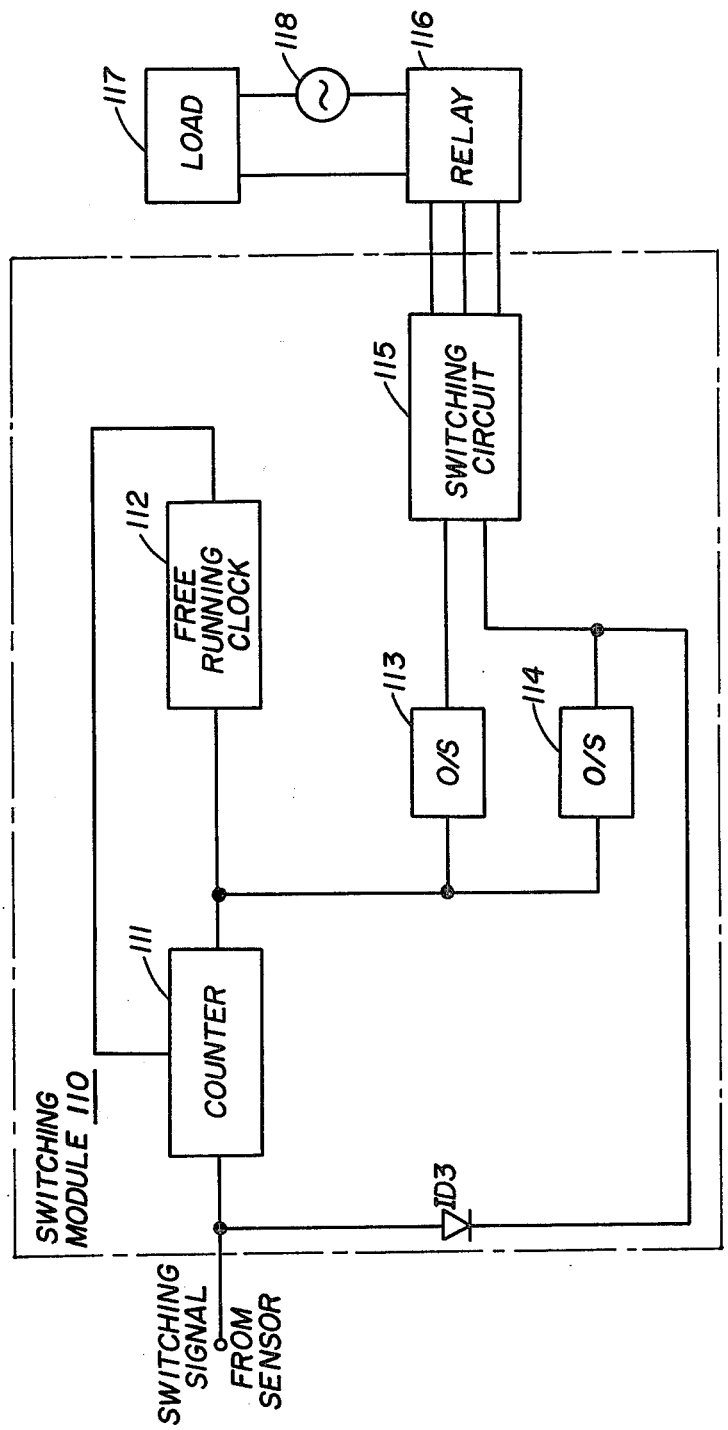
FIG. 3A is a block diagram of the switching module of the present invention.

Reference to FIG. 3A a diagrammatic illustration of the switching module 110 is shown. The switching module 110 is comprised of a counter 111, a clock generator 112, two monostables 113 and 114, switching circuits 115, a relay 116, and a load 117 connected to a AC source 118. A switching signal from the sensor 6 clears the counter 111. The last stage Q output (not shown) of the counter 111 enables the oscillator or clock 112, to run, and simultaneously triggers or fires monostable 113, which inturn energizes the switching control circuits 115 to activate the on state of the relay 116, which connects the load 117 with the AC source 118. In the absence of a Doppler signal, a predetermined clock pulse will make the Q output of the last stage of the counter 111 logically high, thus inhibiting the oscillator 112 and triggering a monostable control circuit 114 which in turn activates the off winding of the relay 116 and disconnects the load 117 from the AC source 118.

The purpose of the switching module is as follows:
1. To provide a time delay between last sensing of movement before disconnecting loads from their respective AC sources.
2. To enable the switching circuits to control the connection and removal of the loads from their AC sources.
3. To suppress the current transients due to the switching of the loads from their AC sources.

Figure 3B:
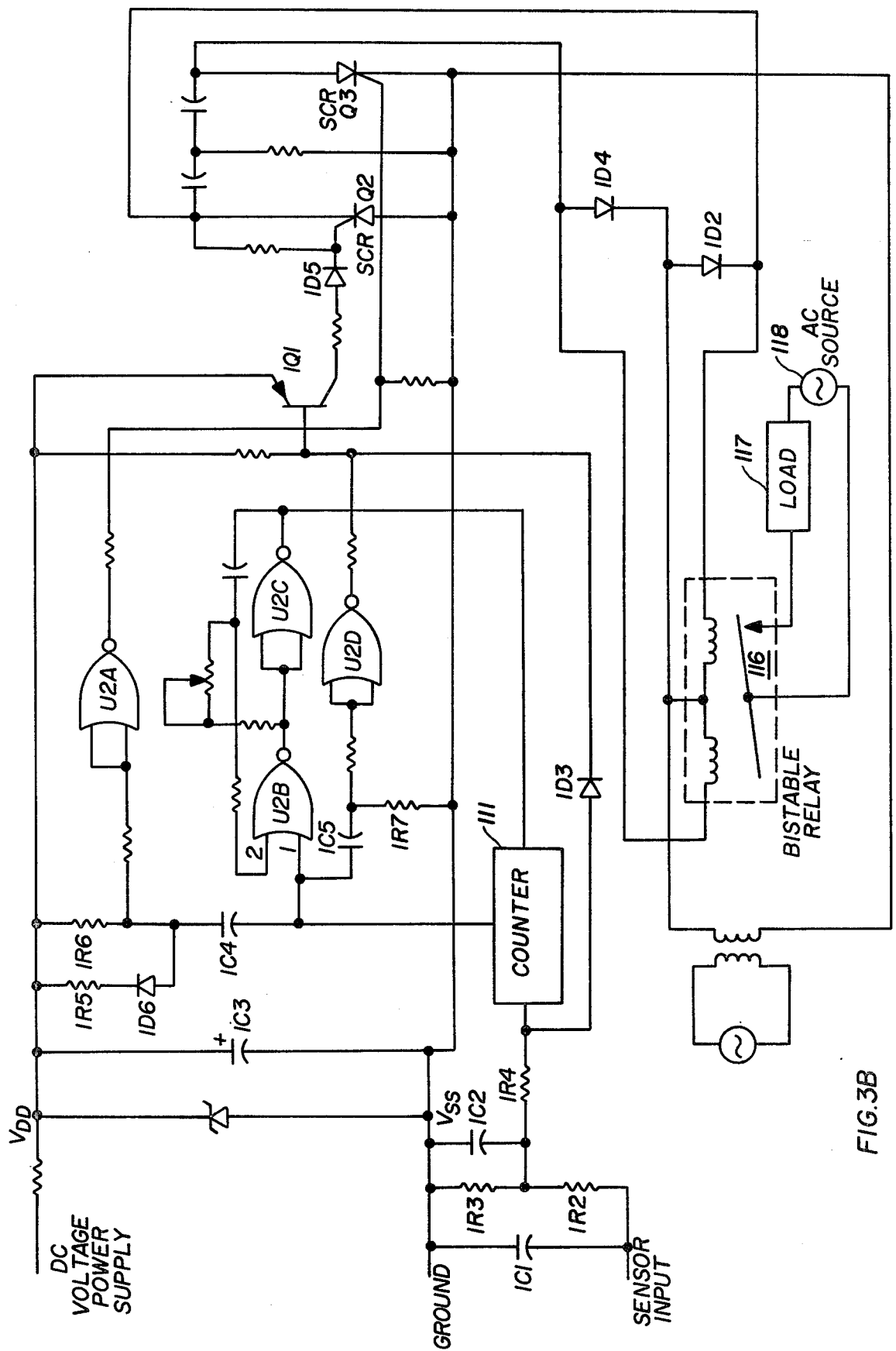
FIG. 3B is a schematic diagram corresponding to the block diagram of FIG. 3A.

Referring to FIG. 3B a schematic illustration of the switching module 110 is shown. The output of the sensor 6, is connected to the junction of capacitor 1C1 and resistor 1R2. Capacitor 1C1, provides a low impedance path to ground for high frequencies which can be coupled on the input line. Filtering out high frequency components, resistors 1R2 and 1R3 from a suitable voltage divider for a suitable voltage input to the counter 111. Capacitor 1C2 provides additional filtering. Resistor 1R4 limits the current to the reset or clear input of the counter 111. The active state, being high, and representative of Doppler frequency returns the counter 111 output stage to a low state. Capacitor 1C4 conducts and a low state is felt by the input of monostable U2A. The output of monostable U2A switches to high state providing the gating voltage for SCR Q3, allowing SCR Q3 to conduct, switching the relay 116 to the on state connecting the load 117 to the AC sources 118. Capacitor 1C4, after coupling the low level of the output of counter 111, begins to charge positively provided by current path resistor 1R6. When the voltage reaches the threshold level of monostable 1U2A the output of monostable 1U2A returns to its stable low state, removing the gating voltage to SCR Q3 and SCR Q3 discontinues to conduct removing the switching current from the relay 116 on state circuit. This low state of the counter 111 output also enables the clock to run, since this causes input 1 of gate U2B, a NOR gate, inactive or non-effective allowing input 2 of gate U2B to govern the switching of gate U2B. The output of gate U2C consequently, provides a pulse train to the clock input of counter 111, causing counter 111 to count up. When the clock U2B, U2C and associated components has incremented the counter 111 to a prescribed count, the output of counter 111 switches to a high state. When the output of counter 111 is a high state, capacitor 1C5 conducts and a high state is felt by the input of monostable U2D causing monostable U2D's output to switch low. The low output of monostable U2D causes transistor 1Q1 to conduct providing a gating voltage for SCR Q2 to conduct, switching the relay 116 to the off state, disconnecting the load 117 from its AC source 118. As capacitor 1C5 charges to a high level of the output of counter 111, capacitor 1C5 discontinues conduction causing the input of monostable U2D to return to a low state provided by current path resistor 1R7, causing the output of monostable U2D to return to its stable high state, removing the gating voltage provided by transistor 1Q1 from SCR Q2. This causes SCR Q2 to discontinue conduction and removing the switching current from the relay 116 off state circuit.

The period of time required for the sequence of events, described above, to occur beginning with last active signal from the sensor 6, is the delay time. This time delay period is aborted and reinitialized as long as the sensor 6 indicates the presence of Doppler energy, characteristic of human movement; therefore, maintaining the present state of the switching circuits 115.

A problem prior to the present invention, has been one of isolating the switching of the load 117 to and from the AC source 118. This connecting and disconnecting of the load 117 causes current transients which can be coupled back into the switching circuits and Doppler sensing circuits. These current transients can effect the switching and Doppler sencing circuits 115 in such a fashion as to reverse the state of the switching circuit, by removing the load 117 from the AC source 118 in attempt to apply it, or by applying the load 117 to the AC source 118 in attempt to remove it. By the utilization of a bistable relay 116, the high voltage AC sources 118 are isolated from the circuits sensative to current transients. Lower AC voltages can be used to switch the higher AC voltages via the relays 116. The bistable relays 116, or three wire relays, only require momentary switching voltages to connect or disconnect the loads 117. This momentary period of time to switch the relay, limits the possibility of current transients being coupled back into the system through the low AC voltage lines, to this said momentary period of time. Since the timing device, achieved by a digital approach, and since the CMOS circuitry used in this system have high noise immunity characteristics, the problem of current transients caused by the connecting of the load 117 to source 118, is eliminated. The circuits most sensitive to the current transients are the Doppler sensing circuits. Once a Doppler is sensed and the process of switching is started any interference introduced by current transients created by the switching of the load 117 can affect the Doppler sensor circuits. Two possible results would be:
1. The removal of the reset input signal from counter 111.
2. Maintaining the reset input signal to counter 111.

The first result has no effect since the output of counter 111 has returned to a low state and will remain low for the prescribed increments provided by the clock U2B, U2C and associated components. This low state from the output of counter 111 ensures the monostable U2A to be low for the duration required to fully activate the relay 116. The second result has no effect since the input to the counter, 111 being of an active high state, representative of false Doppler detection caused by the introduction of current transients, has already taken effect due to the detection of true Doppler prior to switching of the load 117 to the AC source 118. If the effect of the interference of current transients introduced by the switching of the load 117 maintains an active state of the reset input, a false representation of Doppler detection, this false Doppler detection caused by current transients can only be maintained for no greater length of time than the unstable state of the monostable, U2A. Once the monostable U2A returns to its stable state, the switching of the load 117 to the AC source 118 has been accomplished, therefore, the cause for possible false Doppler detection introduced by current transients has been removed.

For the disconnecting of the load 117, the current transients can result in: having
1. Having no effect by maintaining a low state to reset input of counter 111.
2. Cause the reset input to counter 111 to switch to an active high state.

This changing of state to a high at the reset input of counter 111 is undesirable since this is at the point in the sequence of events that there has been no sensing of Doppler for a period of time. A false representation of Doppler, representative of a high state at the reset input to the counter, 111, would reset the counter 111, causing the output of counter 111 to switch to a low state causing capacitor 1C5 to discharge. The discharging of capacitor 1C5 switches monostable U2D to a stable high state removing switching voltage to transistor 1Q1. The removal of switching voltage to transistor 1Q1 causes transistor 1Q1 to cease conduction removing gating voltage to gate of SCR Q2. The removal of gating voltage to gate of SCR Q2 causes SCR Q2 to cease conduction required to activate the off state of the relay 116. Simultaneously the timing device provided by counter 111 and the clock, U2B, U2C and associated components, is reinitialized and monostable U2A is triggered by the low state of the counter 111 output coupled across capacitor 1C4. The low state coupled across capacitor 1C4 causes the output of monostable U2A to switch high providing a gating voltage to the gate of SCR Q3 allowing SCR Q3 to conduct. The conduction of SCR Q3 activates the on state of the relay 116 connecting the load 117 to the AC source 118. The false Doppler detection caused by the introduction of current transients has resulted in applying the load 117 to the AC source 118 in attempting to remove the load 117 from the AC source 118. The anode of diode 1D3, is connected to reset line and the cathode of diode 1D3 to the output of monostable, U2D, inhibits the undesirable occurrence as described above. As the output of U2D, the monostable which provides the relay off signal, switches to a low state, the diode 1D3, is provided with cathode bias. When a current transient causes a false Doppler detection and the reset line to the counter 111 switches to a high state diode 1D3, is forward biased, clipping the reset line voltage below the input threshold level required for resetting the counter 111. Therefore, the proper sequence of events are preserved. When the monostable, U2D, returns to its stable state, switching of the load 117 from its AC source 118 has been accomplished and the cathode bias of diode 1D3, provided by the output of the monostable U2D, is removed allowing subsequent real Doppler detection to reinitialize the process.

What is claimed is:
1. A motion detection system for coupling a power circuit to a load upon receipt of a Doppler energized ultrasonic wave characteristic of human movement and for deactivating the power circuit after cessation of human movement, comprising:
   a. a transmission means for producing ultrasonic waves of a generally constant carrier frequency and amplitude to be radiated into a space to be maintained under surveillance;
   b. a sensor means for receiving and for producing a first electrical signal representative of said Doppler energized ultrasonic wave;
   c. a device for receiving and amplifying said first electrical signal to produce a second electrical signal, said device including a gain control means for maintaining a generally constant amplitude of said second electrical signal within a predetermined range, said device further including a first delay means having a time period such that the gain control means does not begin to function until after the lapse of said time period whereby said second electrical signals having amplitudes outside said predetermined range and having a short term duration less than said time period are unaffected by said gain control means, said time period suitably chosen such that variations of said short term duration in Doppler signal amplitudes characteristic of human motion are unaffected by said gain control means while variations in Doppler signal amplitudes characteristic of background noise and having durations greater than said time period are eliminated by said gain control means;
   d. a detector means for processing said second electrical signal to produce an output signal representative of human movement in said space maintained under surveillance;
   e. a switching means for producing a power circuit activation signal upon receipt of said output signal, and for producing a power circuit deactivation signal in the absence of said output signal; and
   f. a connecting means responsive to said power circuit activation and deactivation signals to respectively couple and decouple the power circuit and the load.

2. The motion detection system according to claim 1 wherein the switching means comprises a second delay means having a time period such that production of the power circuit deactivation signal is delayed until the lapse of said time period.

3. A device, for use in a motion detection system providing for coupling a power circuit to a load upon receipt of a Doppler energized ultrasonic wave characteristic of human movement and for deactivating the power circuit from the load after cessation of human movement, said device receiving and amplifying a first electrical signal to produce a second electrical signal, comprising a gain control means for maintaining a generally constant amplitude of said second electrical signal within a predetermined range, said device further comprising a first delay means having a time period such that the gain control means does not operate until after the lapse of said time period whereby said second electrical signals having amplitudes outside said predetermined range and having a short term duration less than said time period are unaffected by said gain control means, said time period suitably chosen such that variations of said short term duration in Doppler signal amplitudes characteristic of human motion are unaffected by said gain control means while variations in Doppler signal amplitudes characteristic of background noise and having durations greater than said time period are eliminated by said gain control means.

4. The device of claim 3 further comprising a means for varying the gain of said gain control means within a predetermined range.

5. The device of claim 4 further comprising a means for decreasing said gain in an inverse relationship to the amplitude of said first electrical signal.

6. The device of claim 5 further comprising a means for variably adjusting said predetermined range of gain.

7. The device of claim 6 wherein said time period is not less than 50 milliseconds.

8. The device of claim 7 wherein said time period is preferably in the range from 250 milliseconds to 1 second.

* * * * *